D. H. McGOOKIN.
Spike-Machine.
No. 164,319.
3 Sheets--Sheet 1.
Patented June 8, 1875.
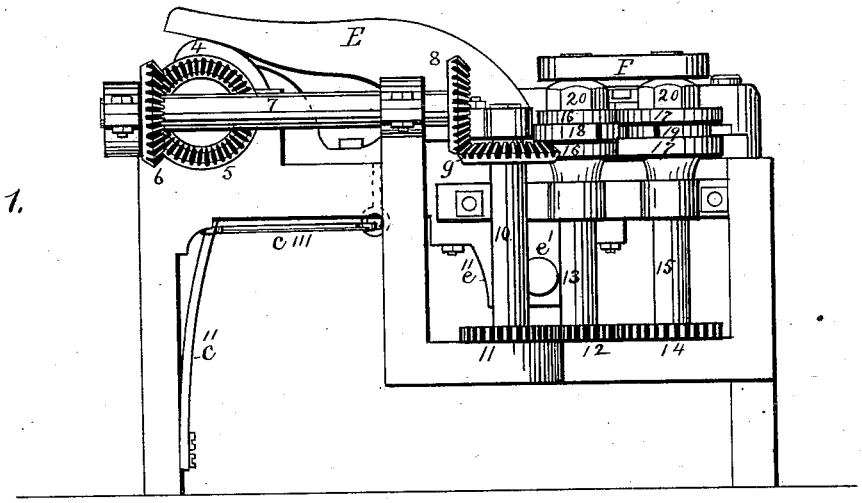
Fig. 1.
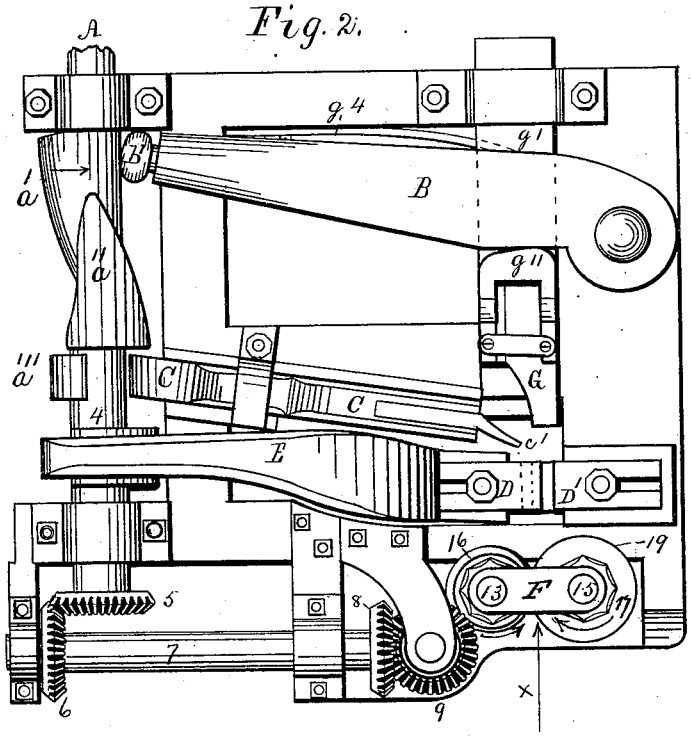
Fig. 2.
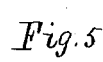
Fig. 5.
Fig. 6.
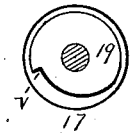
Witnesses:
Benj. Morison.
Wm H Morison.
Inventor:
Dennis H McGookin 3 Sheets--Sheet 2.

D. H. McGOOKIN.
Spike-Machine.

No. 164,319. Patented June 8, 1875.

Witnesses:
Benj. Morison,
Wm H. Morison.

Inventor:
Dennis H. McGookin

THE GRAPHIC CO. PHOTO-LITH. 39 & 41 PARK PLACE, N.Y.

3 Sheets--Sheet 3.

D. H. McGOOKIN.
Spike-Machine.

No. 164,319. Patented June 8, 1875.

Witnesses:
Wm. H. Morison.
Jno. B. Lober

Inventor:
Dennis H. McGookin

UNITED STATES PATENT OFFICE.

DENNIS H. McGOOKIN, OF PHILADELPHIA, PENNSYLVANIA.

IMPROVEMENT IN SPIKE-MACHINES.

Specification forming part of Letters Patent No. 164,319, dated June 8, 1875; application filed April 15, 1875.

*To all whom it may concern:*

Be it known that I, DENNIS H. McGOOKIN, of the city of Philadelphia, in the State of Pennsylvania, have invented an Improvement in Spike-Machines, of which the following is a specification:

The object of my invention is the production of a machine for automatically forming railway-spikes in a rapid and perfect manner, and with either a straight or a curved and notched pointed end, as will be fully and clearly described herein with reference to the accompanying drawing, in which—

Figure 3:
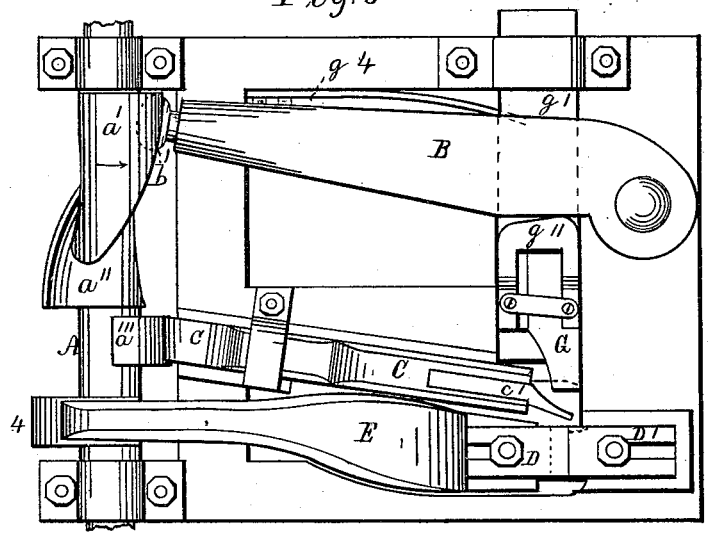
Figure 11:
Figure 4:
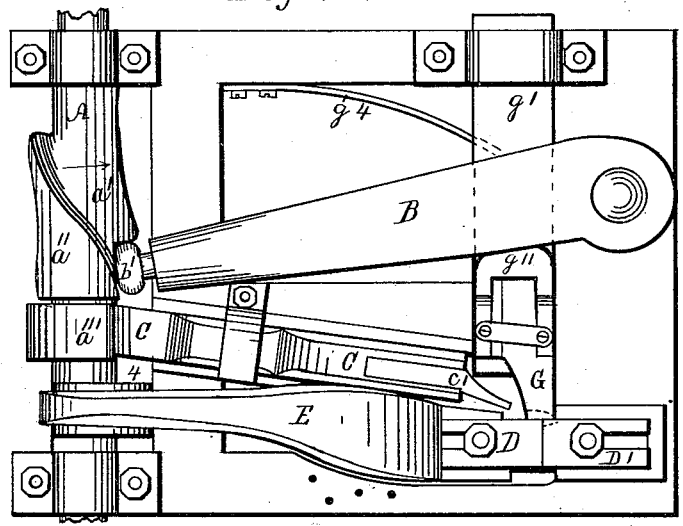
Figure 10:
Figure 9:
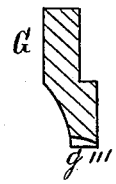
Figure 7:
Figure 8:

Figure 1 is an elevation of the feeding side of the machine embodying my invention; Fig. 2, a plan view of the upper side of the same machine; Fig. 3, a plan view of the upper side of the same machine without the gear-wheels, and with the driving-shaft as rotated half-way around farther than as shown in Fig. 2; Fig. 4, a plan view of the upper side of the same machine, with the heading-lever holding the heading-die in the position which finishes the head of a spike. Figs. 5 and 6 are respective plan views of the two eccentric rolls which form the notched and tapered end of a spike. Fig. 7 is a vertical longitudinal section of the dies which gripe the square section of the body of the spike and hold it firmly for heading. Fig. 8 is a view of the rear side of the said dies, showing the cavity in which the under side of the head of the spike is formed. Fig. 9 is a horizontal section of the header detached; and Figs. 10 and 11 are respective side elevations of the notched and of the straight tapering ends of the spikes formed by the machine. Figs. 12, 13, 14, 15 are plan views, enlarged, of the eccentric rolls in four different stages of their simultaneous rotary motions, with their successive action upon the spike-bar between them.

The main driving-shaft A carries an obliquely-curved cam, $a'$ $a''$, which moves the heading-lever B, which communicates with said cam by means of a friction-roller, $b'$, on its longer end. (See Figs. 2, 3, and 4.) The said driving-shaft A also carries a cam, $a'''$, which forces forward the slide C, which carries at its forward end an adjustable extension, C', for bending before it the projecting end of the spike, (not shown,) out of which the elongated head shown in Figs. 10 and 11 is immediately afterward produced, as will be described. The said shaft A also carries another cam, 4, which raises and lets down alternately the longer arm of a lever, E, the fulcrum-pin $e'$ of which lever passes through a strong thick portion of said lever, and supports it in corresponding bearings $e''$, which are bolted to the under side of the top part of the frame. (See Fig. 1.) The shorter end of this lever E carries one of the pair of adjustable dies D D', which, when abutted together or closed, as shown in Figs. 3 and 4, leave a square hole horizontally across between them, as shown at $d''$ in Figs. 7 and 8, for giving the proper form and size of the body of the spike, and griping it firmly after the latter has been forced along through the same, as will be explained. The cam 4 raises the longer arm of the lever E, and thus causes the die D to abut against the fixed die D', and so remain until the head of the spike, which may be in the dies D D', is completed, as will be explained. The cam 4, having, in the meantime, passed around the required distance, allows the longer arm of the lever E to sink downward, and, consequently, open the dies sufficiently to let the finished spike drop into any suitable receiver.

Figure 12:
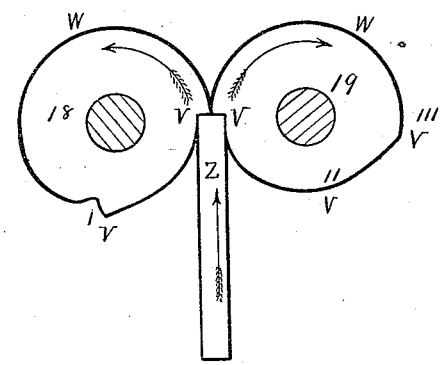
Figure 13:
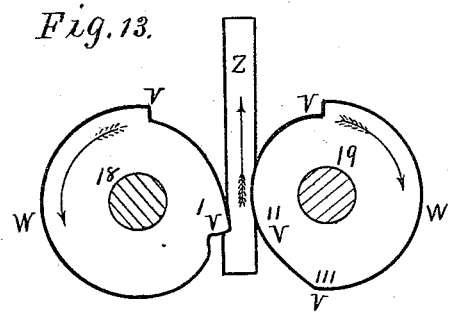
Figure 14:
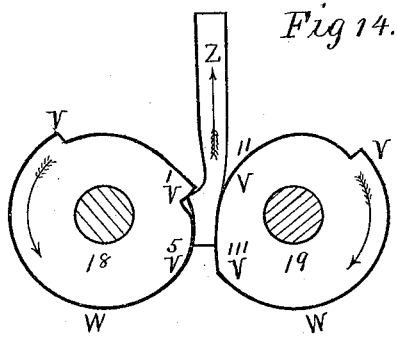
Figure 15:
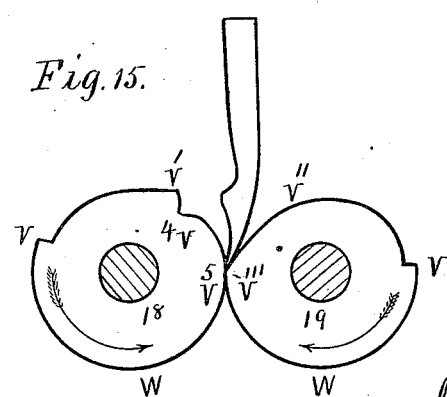

The projecting end of the main shaft A carries a bevel-gear wheel, 5, which gears with a like wheel, 6, on a shaft, 7, having a like wheel, 8, on its opposite end, which gears with another like wheel, 9, on the upper end of a vertical shaft, 10, the lower end of which shaft carries a spur-wheel, 11, that gears with a like spur-wheel, 12, on the lower end of another vertical shaft, 13, and this last-named spur-wheel 12 gears with a like wheel, 14, on a like shaft, 15; and the two upper ends of the shafts 13 and 15, being supported in vertical positions parallel to each other, carry, respectively, circular disks and eccentric rolls, whereby the strongly-heated bar of iron (not shown) is fed into the machine to be formed into spikes, as will be explained. Each of the two vertical shafts 13 and 15 carry two flat circular disks, 16 16 and 17 17, the two on shaft 13 being of equal diameters, and the two on shaft 15 being also of equal diameters, but larger than the diameters of those on shaft 13. Between the said respective pairs of disks 16 16 and 17 17 the two eccentric rolls 18 and 19 are clamped, by means of screw-nuts 20 20, after the said eccentrics are adjusted with their respective offsets or notches V V reversed as to each other, and in direct contact, as shown in Fig. 12, in which relative positions the said rolls are ready to receive the heated bar of iron Z. The roll 18 from V to V' is eccentric, and the roll 19 from V to V'' is concentric, and from V'' to V''' it is eccentric, and the roll 18 from the notch V$^4$ is eccentric to V$^5$, where the large concentric curve W of each roll comes into contact and pinches off the notched and curved pointed end of the spike. (See Figs. 12 and 13.) The two concentric curves W W of rolls 18 and 19 rotate in the directions of the respective arrows thereon, in close contact with each other, until their respective ends V V meet again, ready to receive between their recesses thereat the heated end of the bar Z, as shown in Fig. 12. Fig. 13 shows the same bar Z compressed by the eccentric curve of roll 18 at V'. Fig. 14 shows the same bar Z still farther forced inward, the notch of the spike formed thereon, and released, while the curved tapering end of the spike is being formed by the gradual approach of the respective eccentric curves of the rolls, as shown in the figure; and Fig. 15 shows the concentric curves W W in contact, and, consequently, the pointed curved end of the spike detached from the bar of iron, (not shown in this figure,) and in the position in which it would be griped by the holding-dies D D', and its head formed. (See Figs. 2, 3, and 4.) The larger diameters of the circular disks 17 17 cause their perimeters to roll in contact with the perimeters of the smaller circular disks 16 16; and the greater diameters of the two like eccentric rolls 18 and 19, respectively, are less than the diameters of the larger disks 17 17, respectively, by at least twice the full width or cross-section of the bar out of which the spike is to be produced; and thus a square sectional groove for the reception and advance of said bar is afforded. As an additional means of preventing the said disks and eccentric rolls from being forced, by the passing bar of iron, apart from their properly-adjusted positions, a tie-bar, F, is slipped over the projecting upper ends of the shafts 13 and 15. (See Figs. 1 and 2.) The header G is adjustably secured in a slide, $g'$, which is carried forward by the forward motion of the lever B pressing against a shoulder, $g''$, and thrown backward, together with the actuating-lever B, by a strong spring, $g^4$, after the head of the spike has been completed by the forward motion. The die end of the header G is made with a concavity, $g'''$, (see Fig. 9,) which is an exact counterpart of the upper surface of the head of the spike to be formed, and is adjusted to exactly meet the concavity $d'''$ in the side of the die D', (see Fig. 8,) in which the sloping under and lateral sides of said head are formed simultaneously by the pressure of the header G immediately after the end of the body of the spike to be headed has been projected a sufficient distance from the square opening $d''$ of the dies D D', and turned over toward one side by the action of the slide C. (See Fig. 2, which shows the dies D D' open, and Figs. 3 and 4, which show them closed.) The slide C, after it has pressed the projecting end of the bar over to form the laterally-elongated head on the spike, is retracted by a spring, $c''$, (on the frame,) which is connected to said slide by a wire, $c'''$.

The operation of my improved machine for making spikes is as follows, viz: The parts being in the relative positions shown in Fig. 2, the hot bar of iron is inserted in the direction of the arrow $x$, into the square opening between the eccentric rolls 18 and 19, and the latter carrying it forward into the jaws of the dies D D', the lever E, being quickly raised by the cam 4, which is carried around by the main shaft A, rotating in the direction of the arrow thereon, closes the said dies D D' upon the bar, and the slide C, being pushed forward by the cam $a'''$, at the same time pushes over before it a short projection of the bar toward the cavity $d'''$, (see Fig. 8,) and immediately after the slide is drawn back by the spring $c''$, and while the slide is being so retracted, the obliquely-curved cam $a'$ on shaft A carries the lever-arm B forward, and thus causes the header G to close firmly upon the dies D D' and form the head of the spike, and immediately afterward the end of the lever B enters under the cam $a''$, and is forced backward by it, in connection with spring $g^4$ of the header G, when the dies D D' again open and let the finished spike fall into any suitable receptacle placed for the purpose. At the time the body of the spike is grasped by the dies D D' the notched and tapered end of the spike has been formed and finally pinched off by the coming into contact of the regular curves W W of the respective rolls 18 and 19, as shown in Fig. 15. The precise forms of the perimeters of the two rolls 18 and 19, respectively, whereby the notched and curve-pointed end of the spike, Fig. 10, is produced, as well as the progress of the hot bar of iron between the said rolls, are clearly shown in Figs. 12, 13, 14, and 15, and any further explanations seem to be unnecessary.

For straight taper-pointed spikes without notches, the rolls shown by Figs. 5 and 6 are intended to be substituted in the same machine.

I claim as my invention—

In a spike-machine, the eccentric rolls 18 and 19, constructed with the respective offsets, eccentric and concentric curves, in their perimeters, and arranged to operate together upon the hot bar of iron Z, as described, and shown in Figs. 12, 13, 14, and 15, for the purposes specified.

DENNIS H. McGOOKIN.

Witnesses:
BENJ. MORISON,
WM. H. MORISON.